(12) United States Patent  
Haugen et al.

(10) Patent No.: US 10,994,937 B2  
(45) Date of Patent: May 4, 2021

(54) CONVEYOR WITH ANGULARLY ORIENTED CLEATS

(71) Applicant: WCCO Belting, Inc., Wahpeton, ND (US)

(72) Inventors: Chad R. Haugen, Wahpeton, ND (US); Travis Mackey, Wahpeton, ND (US); Vineet Saxena, Wahpeton, ND (US); Carter Pedersen, Wahpeton, ND (US)

(73) Assignee: WCCO Belting, Inc., Wahpeton, ND (US)

( * ) Notice: Subject to any disclaimer, the term of this patent is extended or adjusted under 35 U.S.C. 154(b) by 0 days.

(21) Appl. No.: 16/809,004

(22) Filed: Mar. 4, 2020

(65) Prior Publication Data

US 2020/0299065 A1   Sep. 24, 2020

Related U.S. Application Data

(60) Provisional application No. 62/822,636, filed on Mar. 22, 2019.

(51) Int. Cl.
*B65G 15/42* (2006.01)

(52) U.S. Cl.
CPC ...... *B65G 15/42* (2013.01); *B65G 2201/0202* (2013.01); *B65G 2812/02217* (2013.01)

(58) Field of Classification Search
CPC .. B65G 2201/0202; B65G 2812/02217; B65G 15/42; B65G 15/44
USPC .................................. 198/690.2, 698–699
See application file for complete search history.

(56) References Cited

U.S. PATENT DOCUMENTS

| | | | | |
|---|---|---|---|---|
| 810,510 | A * | 1/1906 | Robins | B65G 15/42 |
| 2,303,762 | A * | 12/1942 | La Rue | B65G 15/42 |
| | | | | 198/690.2 |
| 2,711,816 | A * | 6/1955 | Reno | B65G 15/44 |
| | | | | 198/713 |

(Continued)

FOREIGN PATENT DOCUMENTS

| | | |
|---|---|---|
| BR | 8207227 A | 7/1984 |
| EP | 2824242 A2 | 1/2015 |
| NL | 9100014 A | 8/1992 |

OTHER PUBLICATIONS

International Search Report and Written Opinion for Application Serial No. PC/US2020/020945, dated Jul. 29, 2020, 17 pgs.

*Primary Examiner* — Mark A Deuble
(74) *Attorney, Agent, or Firm* — Michael A. Bondi; Moss & Barnett

(57) ABSTRACT

A conveyor including a conveyor belt and a first cleat. The conveyor belt has a first side edge that is opposite a second side edge. The conveyor belt also has a first belt end and a second belt end that is opposite the first belt end. The first cleat is attached to the conveyor belt. The first cleat includes a main cleat portion and a first tail cleat portion. The main cleat portion has a main cleat first end and a main cleat second end. The main cleat first end is closer to the first side edge than the main cleat second end. The main cleat portion is oriented at an angle of less than about 90 degrees with respect to the first side edge so that the main cleat first end is closer to the first belt end than the main cleat second end. The first tail cleat portion includes a tail cleat first end and a tail cleat second end. The tail cleat first end is closer to the first belt end than the tail cleat second end. The tail cleat second end is proximate the main cleat second end.

22 Claims, 2 Drawing Sheets

(56) References Cited

U.S. PATENT DOCUMENTS

| | | | | |
|---|---|---|---|---|
| 3,756,382 | A | * 9/1973 | Adey, Jr. | B65G 15/42 198/690.2 |
| 3,853,016 | A | * 12/1974 | Lane, III | A01D 57/06 198/698 |
| 3,910,405 | A | 10/1975 | Couperus | |
| 4,611,706 | A | 9/1986 | Niemann | |
| 6,179,238 | B1 | * 1/2001 | Phillipps | B65H 75/44 191/12.4 |
| 6,371,280 | B1 | * 4/2002 | Lindner | A01F 15/18 198/690.2 |
| 6,571,935 | B1 | * 6/2003 | Campbell | B65G 15/42 198/690.2 |
| 7,124,879 | B1 | * 10/2006 | Maguire | B65G 15/42 198/690.2 |
| 2002/0175055 | A1 | * 11/2002 | Ryde | B65G 15/42 198/847 |
| 2012/0285801 | A1 | * 11/2012 | Neufeld | B65G 41/002 198/690.2 |
| 2014/0262692 | A1 | * 9/2014 | Williamson | B65G 15/42 198/690.2 |

* cited by examiner

CONVEYOR WITH ANGULARLY ORIENTED CLEATS

REFERENCE TO RELATED APPLICATION

This application claims priority to U.S. Appl. No. 62/822,636, which was filed on Mar. 22, 2019. The contents of which are incorporated herein by reference.

FIELD OF THE INVENTION

The invention relates generally to conveyor belts. More particularly, the invention relates to conveyors with angularly oriented cleats.

BACKGROUND OF THE INVENTION

Because of their ability to move large amounts of material, conveyors have long been used in industry such as for moving agricultural products, rocks and other mined materials and various manufactured products.

In many situations, the conveyors include a plurality of cleats that extend from the surface thereof in a spaced-apart configuration. The cleats enhance the amount of product that can be moved using the conveyor as compared to configurations that do not include cleats.

One area in which conveyors are extensively used is equipment for moving agricultural products because the conveyor minimizes the potential damage to the agricultural products. In certain situations, it is desired for the conveyor to have a flat cross-section configuration.

SUMMARY OF THE INVENTION

An embodiment of the invention is directed to a conveyor that includes a conveyor belt and a first cleat. The conveyor belt has a first side edge that is opposite a second side edge. The conveyor belt also has a first belt end and a second belt end that is opposite the first belt end. The first cleat is attached to the conveyor belt. The first cleat includes a main cleat portion and a first tail cleat portion. The main cleat portion has a main cleat first end and a main cleat second end. The main cleat first end is closer to the first side edge than the main cleat second end. The main cleat portion is oriented at an angle of less than about 90 degrees with respect to the first side edge. The first tail cleat portion has a tail cleat first end and a tail cleat second end. The tail cleat first end is closer to the second belt end than the tail cleat second end. The tail cleat first end is proximate the main cleat second end.

Another embodiment of the invention is directed to a method of reducing noise while conveying product on a conveyor. A conveyor is provided that includes a conveyor belt to which a first cleat is attached. The conveyor belt has a first side edge that is opposite a second side edge. The conveyor belt also has a first belt end and a second belt end that is opposite the first belt end. The first cleat includes a main cleat portion and a first tail cleat portion. The main cleat portion has a main cleat first end and a main cleat second end. The main cleat first end is closer to the first side edge than the main cleat second end. The main cleat portion is oriented at an angle of less than about 90 degrees with respect to the first side edge. The first tail cleat portion includes a tail cleat first end and a tail cleat second end. The tail cleat first end is closer to the second belt end than the tail cleat second end. The tail cleat first end is proximate the main cleat second end. A product is placed on the conveyor. The conveyor is moved.

Another embodiment of the invention is directed to a method of reducing vibrations while conveying product on a conveyor. A conveyor is provided that includes a conveyor belt to which a first cleat is attached. The conveyor belt has a first side edge that is opposite a second side edge. The conveyor belt also has a first belt end and a second belt end that is opposite the first belt end. The first cleat includes a main cleat portion and a first tail cleat portion. The main cleat portion has a main cleat first end and a main cleat second end. The main cleat first end is closer to the first side edge than the main cleat second end. The main cleat portion is oriented at an angle of less than about 90 degrees with respect to the first side edge. The first tail cleat portion includes a tail cleat first end and a tail cleat second end. The tail cleat first end is closer to the second belt end than the tail cleat second end. The tail cleat first end is proximate the main cleat second end. A product is placed on the conveyor. The conveyor is moved.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
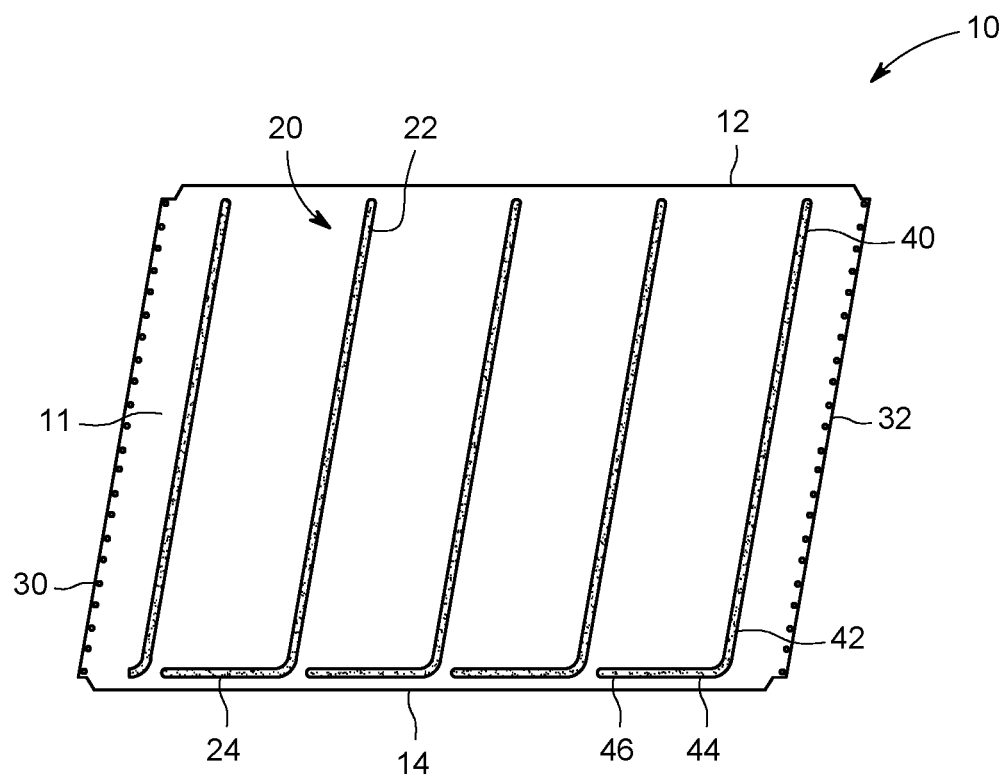
FIG. 1 is a top view of a portion of a conveyor with angularly oriented cleats according to an embodiment of the invention.

An embodiment of the invention is directed to a conveyor 10 having a conveyor belt 11 with at least one angularly oriented cleat 20 extending from an upper surface thereof as illustrated in FIG. 1. The conveyer belt 11 has a generally flat upper surface on which objects are placed to convey the objects.

It has been found that the conveyor 10 with the angularly oriented cleats 20 provides a reduction in noise when operated as compared to a conveyor having non-angularly oriented cleats. In certain embodiments, it has been found that there is a noise reduction of about 10 percent during operation of the conveyor 10 with the angularly oriented cleats 20 as compared to the noise from the conveyor with the non-angularly oriented cleats. As used herein, the conveyor with the non-angularly oriented cleats means that the cleats are oriented perpendicular to the side edges of the conveyor.

Another benefit of using the angularly oriented cleats 20 on the conveyor 10 is that there is a smoother transition as the conveyor 10 moves over the rollers, which means that there are less vibrations of the conveyor 10 as compared to a conveyor with non-angularly oriented cleats. This reduction in vibrations means that there is less stress and strain on the components of the conveyor belt 10 such as belts and bearings as compared to the conveyor with the non-angularly oriented cleats.

The reduced noise and vibrations of the conveyor 10 with the angularly oriented cleats 20 enables the conveyor 10 to be operated at higher speeds than the conveyor with the non-angularly oriented cleats.

The conveyor belt 11 generally include two primary components: (1) a fabric layer and (2) a rubber layer. The type of the fabric layer as well as the thickness of the fabric layer is selected based upon the material that is intended to be transported using the conveyor belt 11 as well as the volume of material that is intended to be transported on the conveyor belt 11.

There are two primary techniques in which the fabric layer is coated with rubber-skim coating and friction coating. With skim coating, a layer of rubber material is laid on the fabric layer but is not forced into the weave on the fabric layer. In contrast, friction coating applies rubber to a fabric layer using a calender with rolls running at different surface speeds to urge the rubber into the weave on the fabric layer.

While skim coating is typically viewed as being suitable for use in conjunction with a variety of fabrics, the layer of rubber provided by skim coating is typically much thicker than the layer of rubber that is provided by friction coating.

The thicker rubber layer produced from skim coating increases the weight of the conveyor belts that contain the skim coated belting material. This extra weight may restrict the capacity of the conveyor belts that contain the skim coated rubber. Alternatively, the components of the conveyor belts that contain the skim coated rubber may need to be fabricated with a higher capacity.

Depending on the intended use of the belting material, it is possible to coat one or both of the fabric layer surfaces with rubber. It is also possible to use different coating techniques during the coating process. For example, friction coating may be used on one side of the fabric layer and skim coating may be used on the other side of the fabric layer.

While it is possible for the concepts of the invention to be used in conjunction with various rubber compositions, in certain embodiments, the rubber coating contains styrene butadiene rubber as a primary rubber component.

Prior to coating the fabric layer with rubber, the fabric layer may be treated to enhance the rubber adhesion, an example of which includes applying a layer of resorcinol formaldehyde latex to the surface of the fabric layer. After the rubber has been coated on the fabric layer, it is possible to use additional techniques to increase the strength and/or durability of the rubber, examples of which include pressure and heat, which is conventionally referred to as vulcanizing.

The conveyer belt 11 is generally configured so that opposite belt ends 30, 32 thereof are attached to each to form a continuous belt. The conveyor belt 11 generally includes a first side edge 12 and a second side edge 14 at opposite edges thereof. In certain embodiments, the first side edge 12 and the second side edge 14 are both substantially parallel.

To enhance the amount of material that can be conveyed on conveyor 10, the plurality of cleats 20 are attached to the upper surface of the conveyor belt 11. A person of skill in the art will appreciate that factors such as the spacing between the cleats 20 and the height of the cleats 20 may be selected based upon a variety of factors such as the shape and size of the material that is to be conveyed on the conveyor 10.

In certain embodiments, the cleats 20 are oriented generally parallel to each other and a spacing between adjacent cleats 20 is substantially equal. A person of skill in the art will appreciate that not all of the cleats 20 may be positioned generally parallel to each other and that the spacing between adjacent cleats 20 may not be substantially equal.

The cleats 20 may be attached to the conveyer belt 11 either during the process of fabricating the conveyor 10 or may be attached to the conveyor belt 11 after fabrication. Factors impacting the manner in which the cleats 20 are attached to the conveyor belt 11 include the materials from which the cleats 20 are fabricated and the likely need to replace the cleats 20 during the useful life of the conveyor 10.

The cleats 20 generally include a main cleat portion 22 and a tail cleat portion 24. The main cleat portion 22 has a main cleat first end 40 and a main cleat second end 42. The tail cleat portion 24 has a tail cleat first end 44 and a tail cleat second end 46.

As illustrated in FIG. 1, the main cleat portion 22 is substantially linear and the main cleat first end 40 is proximate the first side edge 12. The main cleat portion 22 is oriented at an angle with respect to the first side edge 12 in a direction oriented toward the first belt end 30. To minimize the potential of the cleats 20 intersecting the end of the conveyor belt 11, the main cleat portion 22 may be oriented generally parallel to the second belt end 32. In certain embodiments the angle is between about 45 degrees and about 85 degrees. In other embodiments, the angle is between about 70 degrees and about 80 degrees.

Orienting the main cleat portion 22 at the angle causes the material (not shown) being conveyed on the conveyor 10 to be directed from the second side edge 14 to the first side edge 12. Such movements of the material from the first side edge 12 to the second side edge 14 as the conveyor belt 11 is moved reduces the potential of the material falling off the first side edge of the conveyor belt 11. For example, when the conveyor belt 11 is used on a header of an agricultural harvesting machine, the angled main cleat portion 22 reduces the potential of the harvested product falling off the header during the harvesting process.

The tail cleat portion 24 is oriented at an angle with respect to the main cleat portion 22. The tail cleat portion 24 may be oriented generally parallel to the second side edge 14. Using such a configuration, a distance between the second side edge 14 and the tail cleat first end 44 is approximately the same as a distance between the second side edge 14 and the tail cleat second end 46. In other embodiments, the tail cleat portion 24 may be oriented at an angle, with respect to the second side edge 14 in a direction oriented toward the second belt end 32.

While it is illustrated that the tail cleat portion 24 is attached to and extends from the main cleat portion 22, in other embodiments, the tail cleat portion 24 may be separate from the main cleat portion 22.

The tail cleat portion 24 may be positioned proximate the second side edge 14. In other embodiments, there is a spacing between the tail cleat portion 24 and the second side edge 14.

Proximate the intersections of the tail cleat portion 24 and the main cleat portion 22, there may be a curved region to minimize the potential of the material being conveyed on the conveyor 10 becoming stuck by encouraging the material to move towards the rear of the header and away from the cutter bar side of the draper.

The tail cleat portion 24 may have a length that substantially extends from the cleat 20 to which the tail cleat portion 24 is attached to the cleat 20 that is adjacent thereto as illustrated in FIG. 1. In certain embodiments, substantially means greater than about 50% of the distance between adjacent cleats 20. In other embodiments, the tail cleat portion 24 extends greater than about 70% of the distance between the adjacent cleats 20. In still other embodiments, the tail cleat portion 24 extends greater than about 90% of the distance between the adjacent cleats 20.

The first belt end 30 and the second belt end 32 may each have a shape that is substantially similar. In certain embodiments the first belt end 30 and the second belt end 32 are both substantially linear. Depending on the length of the conveyor, multiple conveyor belts 10 may be attached together.

The first belt end 30 and the second belt end 32 may be oriented an angle with respect to the first side edge 12 and the second side edge 14 that is not a right angle. In certain embodiments, the first belt end 30 and the second belt end 32 are both generally parallel to the main cleat portion 22.

Using such a configuration avoids the main cleat portion 22 intersecting with either the first belt end 30 or the second belt end 32. Because of the nature of the tail cleat portion 24 extending generally between adjacent cleats 20, the tail cleat portion 24 may intersect the first belt end 30 or the second belt end 32.

Figure 2:
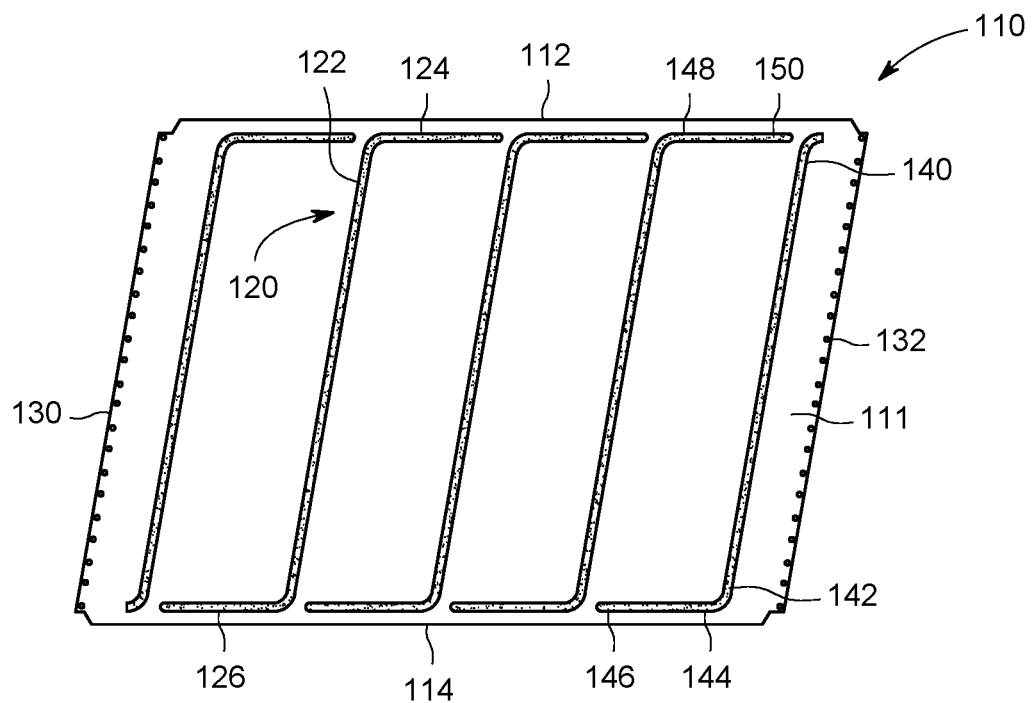
FIG. 2 is a top view of a portion of a conveyor with angularly oriented cleats according to another embodiment of the invention.

In another embodiment which is illustrated in FIG. 2, the conveyor 110 includes a conveyor belt 111 and a cleat 120 having main cleat portion 122, a first tail cleat portion 124, which is proximate the second side edge 114, and a second tail cleat portion 126, which is proximate the first side edge 112. The conveyer belt 111 has a generally flat upper surface on which objects are placed to convey the objects.

The conveyer belt 111 has a generally flat upper surface on which objects are placed to convey the objects. The conveyer belt 111 is generally configured so that opposite belt ends 130, 132 thereof are attached to each to form a continuous belt. The conveyor belt 111 generally includes a first side edge 112 and a second side edge 114 at opposite edges thereof. In certain embodiments, the first side edge 112 and the second side edge 114 are both substantially parallel.

The plurality of cleats 120, which enhance the amount of material that can be conveyed on the conveyor 110, are attached to the upper surface of the conveyor belt 111. A person of skill in the art will appreciate that factors such as the spacing between the cleats 120 and the height of the cleats 120 may be selected based upon a variety of factors such as the shape and size of the material that is to be conveyed on the conveyor 110.

In certain embodiments, the cleats 120 are oriented generally parallel to each other and a spacing between adjacent cleats 120 is substantially equal. A person of skill in the art will appreciate that not all of the cleats 120 may be positioned generally parallel to each other and that the spacing between adjacent cleats 120 may not be substantially equal.

The cleats 120 may be attached to the conveyer belt 111 either during the process of fabricating the conveyor 110 or may be attached to the conveyor belt 111 after fabrication. Factors impacting the manner in which the cleats 120 are attached to the conveyor belt 111 include the materials from which the cleats 120 are fabricated and the likely need to replace the cleats 120 during the useful life of the conveyor 110.

The main cleat portion 122 has a main cleat first end 140 and a main cleat second end 142. The first tail cleat portion 124 has a tail cleat first end 144 and a tail cleat second end 146. The second tail cleat portion 126 has a tail cleat first end 148 and a tail cleat second end 150.

As illustrated in FIG. 2, the main cleat portion 122 is substantially linear. The main cleat portion 122 is oriented at an angle with respect to the first side edge 112 in a direction oriented toward the first belt end 30. To minimize the potential of the cleats 120 intersecting the end of the conveyor belt 111, the main cleat portion 122 may be oriented generally parallel to the second belt end 132. In certain embodiments the angle is between about 45 degrees and about 85 degrees. In other embodiments, the angle is between about 70 degrees and about 80 degrees.

Orienting the main cleat portion 122 at the angle causes the material (not shown) being conveyed on the conveyor 110 to be directed from the second side edge 114 to the first side edge 112. Such movements of the material from the first side edge 112 to the second side edge 114 as the conveyor belt 111 is moved reduces the potential of the material falling off the first side edge of the conveyor belt 111. For example, when the conveyor 110 is used on a header or an agricultural harvesting machine, the angled main cleat portion 122 reduces the potential of the harvested product falling off the header during the harvesting process.

The first tail cleat portion 124 is oriented at an angle with respect to the main cleat portion 122. The first tail cleat portion 124 may be oriented generally parallel to the second side edge 114. Using such a configuration, a distance between the second side edge 114 and the tail cleat first end 144 is approximately the same as a distance between the second side edge 114 and the tail cleat second end 146. In other embodiments, the first tail cleat portion 124 may be oriented at an angle, with respect to the first side edge 112 in a direction oriented toward the second belt end 132.

While it is illustrated that the first tail cleat portion 124 is attached to and extends from the main cleat portion 122, in other embodiments, the first tail cleat portion 124 may be separate from the main cleat portion 122.

The first tail cleat portion 124 may be positioned proximate the second side edge 114. In other embodiments, there is a spacing between the first tail cleat portion 124 and the first side edge 112.

Proximate the intersections of the first tail cleat portion 124 and the main cleat portion 122, there may be a curved region to minimize the potential of the material being conveyed on the conveyor 110 becoming stuck by encouraging the material to move towards the rear of the header and away from the cutter bar side of the draper.

The first tail cleat portion 124 may have a length that substantially extends from the cleat 120 to which the first tail cleat portion 124 is attached to the cleat 120 that is adjacent thereto. In certain embodiments, substantially means greater than about 50% of the distance between adjacent cleats 120. In other embodiments, the first tail cleat portion 124 extends greater than about 70% of the distance between the adjacent cleats 120. In still other embodiments, the first tail cleat portion 124 extends greater than about 90% of the distance between the adjacent cleats 120.

In contrast to the first tail cleat portion 124, which extends in the direction in which the conveyor 110 moves, the second tail cleat portion 126 extends in a direction that is opposite the direction in which the conveyor 110 moves.

The second tail cleat portion 126 is oriented at an angle with respect to the main cleat portion 122. In certain embodiments, the second tail cleat portion 126 may be oriented generally parallel to the first side edge 112. Using such a configuration, a distance between the first side edge 112 and the tail cleat first end 148 is approximately the same as a distance between the first side edge 112 and the tail cleat second end 150. In other embodiments, the second tail cleat portion 126 may be oriented at an angle with respect to the second side edge 114 in a direction oriented toward the first belt end 130.

While it is illustrated that the second tail cleat portion 126 is attached to and extends from the main cleat portion 122, in other embodiments, the second tail cleat portion 126 may be separate from the main cleat portion 122.

The second tail cleat portion 126 may be positioned proximate the first side edge 112. In other embodiments, there is a spacing between the second tail cleat portion 126 and the second side edge 114.

Proximate the intersection of the second tail cleat portions 126 and the main cleat portion 122, there may be a curved region to minimize the potential of the material being conveyed on the conveyor 110 becoming stuck by encouraging the material to move away from the intersection.

The second tail cleat portion 126 may have a length that substantially extends from the cleat 120 to which the second tail cleat portion 126 is attached to the cleat 120 that is adjacent thereto. In certain embodiments, substantially means greater than about 50% of the distance between adjacent cleats 120. In other embodiments the second tail cleat portion 126 extends greater than about 70% of the distance between the adjacent cleats 120. In still other embodiments the second tail cleat portion 126 extends greater than about 90% of the distance between the adjacent cleats 120.

The first belt end 130 and the second belt end 132 may each have a shape that is substantially similar. In certain embodiments the first belt end 130 and the second belt end 132 are both substantially linear. The first belt end 130 and the second belt end 132 may be oriented at an angle with respect to the first side edge 112 and the second side edge 114 that is not a right angle. In certain embodiments, the first belt end 130 and the second belt end 132 are both generally parallel to the main cleat portion 122.

Using such a configuration avoids the main cleat portion 122 intersecting with either the first belt end 130 or the second belt end 132. Because of the nature of the first tail cleat portion 124 and the second tail cleat portion 126 extending generally between adjacent cleats 120, the at least one of the first tail cleat portion 124 and the second tail cleat portion 126 may intersect the first belt end 130 or the second belt end 132.

Another benefit of the configuration of the conveyor 110 in this embodiment is that the conveyor 110 may be symmetrical in both directions. Such a configuration may enable the conveyor 110 to convey products in either direction. This configuration also enables the belt to be installed in either direction.

Figure 3:
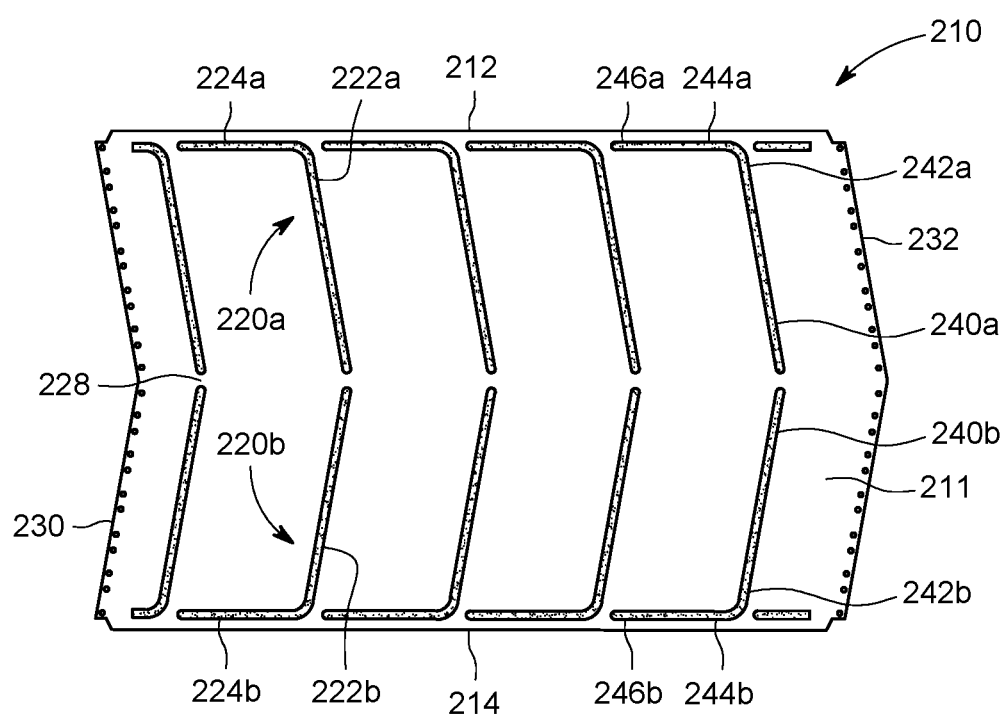
FIG. 3 is a top view of a portion of a conveyor with angularly oriented cleats according to yet another embodiment of the invention.

In another embodiment, which is illustrated in FIG. 3, the conveyor 210 has a conveyor belt 211 and two cleat sections 220a, 220b. The conveyer belt 211 has a generally flat upper surface on which objects are placed to convey the objects.

The conveyer belt 211 is generally configured so that opposite belt ends 230, 232 thereof are attached to each to form a continuous belt. The conveyor belt 211 generally includes a first side edge 212 and a second side edge 214 at opposite edges thereof. In certain embodiments, the first side edge 212 and the second side edge 214 are both substantially parallel.

The plurality of cleats 220, which enhance the amount of material that can be conveyed on the conveyor 210, are attached to the upper surface of the conveyor belt 211. A person of skill in the art will appreciate that factors such as the spacing between the cleats 220 and the height of the cleats 220 may be selected based upon a variety of factors such as the shape and size of the material that is to be conveyed on the conveyor 210.

In certain embodiments, the cleats sections 220a are oriented generally parallel to each other and a spacing between adjacent cleat sections 220a is substantially equal. A person of skill in the art will appreciate that not all of the cleat sections 220a may be positioned generally parallel to each other and that the spacing between adjacent cleat sections 220a may not be substantially equal.

In certain embodiments, the cleats sections 220b are oriented generally parallel to each other and a spacing between adjacent cleat sections 220b is substantially equal. A person of skill in the art will appreciate that not all of the cleat sections 220b may be positioned generally parallel to each other and that the spacing between adjacent cleat sections 220b may not be substantially equal.

While it is illustrated that the cleat sections 220a, 220b are attached to the conveyor belt 211 in general alignment with each other, it is possible for the cleat section 220a, 220b to be attached to the conveyor belt 211 in other alignments.

The cleat sections 220a, 220b may be attached to the conveyer belt 211 either during the process of fabricating the conveyor 210 or may be attached to the conveyor belt 211 after fabrication. Factors impacting the manner in which the cleat sections 220a, 220b are attached to the conveyor belt 211 includes the materials from which the cleat sections 220a, 220b are fabricated and the likely need to replace the cleat sections 220a, 220b during the useful life of the conveyor 210.

The first cleat section 220a generally includes a first main cleat portion 222a and a first tail cleat portion 224a. The first main cleat portion 222a has a main cleat first end 240a and a main cleat second end 242a. The first tail cleat portion 224a has a tail cleat first end 244a and a tail cleat second end 246a.

As illustrated in FIG. 3, the main cleat portion 222a is substantially linear. The first main cleat portion 222a is oriented at an angle with respect to the first side edge 212 in a direction oriented toward the first belt end 230. To minimize the potential of the cleats 220 intersecting the end of the conveyor belt 211, the first main cleat portion 222a may be oriented generally parallel to the second belt end 232. In certain embodiments the angle is between about 45 degrees and about 85 degrees. In other embodiments, the angle is between about 70 degrees and about 80 degrees.

Orienting the first main cleat portion 222a at the angle causes the material (not shown) being conveyed on the conveyor 210 to be directed from the first side edge 212 to center of the conveyor 210. Such movements of the material from the first side edge 212 to center of the conveyor 210 as the conveyor 210 is moved reduces the potential of the material falling off the first side edge 212 of the conveyor 210. For example, when the conveyor 210 is used on a header or an agricultural harvesting machine, the angled first main cleat portion 222a reduces the potential of the harvested product falling off the header during the harvesting process.

The first tail cleat portion 224a is oriented at an angle with respect to the main first cleat portion 222a. The first tail cleat portion 224a may be oriented generally parallel to the first side edge 212. Using such a configuration, a distance between the first side edge 212 and the tail cleat first end 244a is approximately the same as a distance between the first side edge 212 and the tail cleat second end 246a. In other embodiments, the first tail cleat portion 224a may be oriented at an angle, with respect to the first side edge 212 in a direction toward the second belt end 232.

While it is illustrated that the first tail cleat portion 224a is attached to and extends from the first main cleat portion 222a, in other embodiments, the first tail cleat portion 224a may be separate from the first main cleat portion 222a.

The first tail cleat portion 224a may be positioned proximate the first side edge 212. In other embodiments, there is a spacing between the first tail cleat portion 224a and the first side edge 212.

Proximate the intersections of the first tail cleat portion 224a and the first main cleat portion 222a, there may be a curved region to minimize the potential of the material being conveyed on the conveyor 210 becoming stuck by encouraging the material to move towards the center of the conveyor 210.

The first tail cleat portion 224a may have a length that substantially extends from the cleat section 220a to which the first tail cleat portion 224a is attached to the cleat section 220 that is adjacent thereto. In certain embodiments, substantially means greater than about 50% of the distance between adjacent cleat sections 220a. In other embodiments, the first tail cleat portion 224a extends greater than about 70% of the distance between the adjacent cleat sections 220a. In still other embodiments, the first tail cleat portion 224a extends greater than about 90% of the distance between the adjacent cleat sections 220a.

The second cleat section 220b generally includes a second main cleat portion 222b and a second tail cleat portion 224b. The second main cleat portion 222b has a main cleat first end 240b and a main cleat second end 242b. The second tail cleat portion 244b has a tail cleat first end 244b and a tail cleat second end 246b.

As illustrated in FIG. 3, the main cleat portion 222b is substantially linear. The second main cleat portion 222b is oriented at an angle with respect to the second side edge 214 in a direction oriented toward the first belt end 230. To minimize the potential of the cleats 220 intersecting the end of the conveyor belt 211, the second main cleat portion 222b may be oriented generally parallel to the second belt end 232. In certain embodiments the angle is between about 45 degrees and about 85 degrees. In other embodiments, the angle is between about 70 degrees and about 80 degrees.

Orienting the second main cleat portion 222b at the angle causes the material (not shown) being conveyed on the conveyor belt 210 to be directed from the second side edge 214 to center of the conveyor 210. Such movements of the material from the second side edge 214 to center of the conveyor 210 as the conveyor 210 is moved reduces the potential of the material falling off the second side edge 214 of the conveyor belt 211. For example, when the conveyor 210 is used on a header or an agricultural harvesting machine, the angled second main cleat portion 222b reduces the potential of the harvested product falling off the header during the harvesting process.

The second tail cleat portion 224b is oriented at an angle with respect to the second main cleat portion 222b. The second tail cleat portion 224b may be oriented generally parallel to the second side edge 214. Using such a configuration, a distance between the second side edge 214 and the tail cleat first end 244b is approximately the same as a distance between the second side edge 214 and the tail cleat second end 246b. In other embodiments, the second tail cleat portion 224b may be oriented at an angle, with respect to the second side edge 214 in a direction toward the second belt end 232.

While it is illustrated that the second tail cleat portion 224b is attached to and extends from the second main cleat portion 222b, in other embodiments, the second tail cleat portion 224b may be separate from the second main cleat portion 222b.

The second tail cleat portion 224b may be positioned proximate the second side edge 214. In other embodiments, there is a spacing between the second tail cleat portion 224b and the second side edge 214.

Proximate the intersections of the second tail cleat portion 224b and the second main cleat portion 222b, there may be a curved region to minimize the potential of the material being conveyed on the conveyor 210 becoming stuck by encouraging the material to move towards the center of the conveyor 210.

The second tail cleat portion 224b may have a length that substantially extends from the cleat section 220b to which the second tail cleat portion 224b is attached to the cleat section 220b that is adjacent thereto. In certain embodiments, substantially means greater than about 50% of the distance between adjacent cleat sections 220b. In other embodiments the second tail cleat portion 224b extends greater than about 70% of the distance between the adjacent cleat sections 220b. In still other embodiments, the second tail cleat portion 224b extends greater than about 90% of the distance between the adjacent cleat sections 220b.

The first belt end 230 and the second belt end 232 may each have a shape that is substantially similar. In certain embodiments the first belt end 230 and the second belt end 232 both have two substantially linear sections that are oriented at an angle with respect to each other in the shape of the letter "V". The first belt end 230 and the second belt end 232 may be oriented at an angle with respect to the first side edge 212 and the second side edge 214 that is not a right angle. In certain embodiments, the first belt end 230 and the second belt end 232 are both generally parallel to the first main cleat portion 222a and the second main cleat portion 222b.

Using such a configuration avoids the first main cleat portion 222a and the second main cleat portion 222b intersecting with either the first belt end 230 or the second belt end 232. Because of the nature of the first tail cleat portion 224a and the second tail cleat portion 224b extending generally between adjacent cleat sections 220a, 220b, the first tail cleat portion 224a and the second tail cleat portion 224b may intersect the first belt end 230 or the second belt end 232.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A conveyor comprising:
   a conveyor belt comprising a first side edge that is opposite a second side edge, wherein the conveyor belt further comprises a first belt end and a second belt end that is opposite the first belt end; and
   a plurality of first cleats attached to the conveyor belt in a spaced-apart configuration, wherein each of the first cleats comprises:
   a main cleat portion that comprises a main cleat first end and a main cleat second end, wherein the main cleat first end is proximate the first side edge and wherein the main cleat portion is oriented at an angle of less than about 90 degrees with respect to the first side edge; and
   a first tail cleat portion that comprises a tail cleat first end and a tail cleat second end, wherein the tail cleat first end is closer to the second belt end than the tail cleat second end, wherein the first tail cleat portion is attached to the main cleat portion, wherein the first tail cleat portion is proximate the second side edge and wherein the first tail cleat portion is oriented substantially parallel to the second side edge.

2. The conveyor of claim 1, wherein proximate an intersection of the main cleat portion and the first tail cleat portion, each of first cleats is curved.

3. The conveyor of claim 1, wherein the angle is between about 85 degrees and about 45 degrees.

4. The conveyor of claim 1, and wherein each of the first cleats further comprises a second tail cleat portion, wherein an end of the second tail cleat portion is proximate the main cleat first end.

5. The conveyor of claim 4, wherein the first tail cleat portion extends from the main cleat portion towards the first belt end and wherein the second tail cleat portion extends from the main cleat portion towards the second belt end.

6. The conveyor of claim 4, wherein the main cleat portion is substantially linear, wherein the first tail cleat portion is proximate the second side edge and wherein the second tail cleat portion is proximate the first side edge.

7. The conveyor of claim 1, and further comprising:
   a plurality of second cleats attached to the conveyor belt in a spaced-apart configuration, wherein each of the second cleats comprises:
   a main cleat portion that comprises a main cleat first end and a main cleat second end, wherein the main cleat first end is proximate the second side edge and wherein the main cleat portion is oriented at an angle of less than about 90 degrees with respect to the second side edge; and
   a first tail cleat portion that comprises a tail cleat first end and a tail cleat second end, wherein the tail cleat first end is closer to the second belt end than the tail cleat second end, wherein the tail cleat first end is proximate the main cleat second end.

8. The conveyor of claim 7, wherein the main cleat portions on each of the first cleats and each of the second cleats have a length that is substantially equal and wherein the first tail cleat portion on each of the first cleats and each of the second cleats have a length that is substantially equal.

9. A method of conveying product on a conveyor with reduced noise comprising:
   providing a conveyor comprising a conveyor belt to which a plurality of first cleats is attached in a spaced-apart configuration, wherein the conveyor belt comprises a first side edge that is opposite a second side edge, wherein the conveyor belt further comprises a first belt end and a second belt end that is opposite the first belt end, wherein each of the first cleats comprises a main cleat portion and a first tail cleat portion, wherein the main cleat portion comprises a main cleat first end and a main cleat second end, wherein the main cleat first end is proximate the first side edge, wherein the main cleat portion is oriented at an angle of less than about 90 degrees with respect to the first side edge, wherein the first tail cleat portion comprises a tail cleat first end and a tail cleat second end, wherein the tail cleat first end is closer to the second belt end than the tail cleat second end, wherein the first tail cleat first portion is attached to the main cleat portion, wherein the first tail portion is proximate the second side edge and wherein the first tail cleat portion is oriented substantially parallel to the second side edge;
   placing a product on the conveyor; and
   moving the conveyor.

10. The method of claim 9, and further comprising urging the product towards the first side edge as the conveyor moves.

11. The method of claim 9, wherein the main cleat first end is proximate the first side edge and wherein the first tail cleat portion is proximate the second side edge.

12. The method of claim 9, wherein the angle is between about 85 degrees and about 45 degrees.

13. The method of claim 9, and further comprising a second tail cleat portion, wherein an end of the second tail cleat portion is proximate the main cleat first end, wherein the first tail cleat portion extends from the main cleat portion towards the first belt end and wherein the second tail cleat portion extends from the main cleat portion towards the second belt end.

14. The method of claim 13, wherein the main cleat portion is substantially linear, wherein the first tail cleat portion is proximate the second side edge and wherein the second tail cleat portion is proximate the first side edge.

15. The method of claim 9, wherein the conveyor further comprises a plurality of second cleats attached to the conveyor belt, wherein each of the second cleats comprises a main cleat portion and a first tail cleat portion, wherein the main cleat portion comprises a main cleat first end and a main cleat second end, wherein the main cleat first end is closer to the second side edge than the main cleat second end, wherein the main cleat portion is oriented at an angle of less than about 90 degrees with respect to the second side edge, wherein the first tail cleat portion comprises a tail cleat first end and a tail cleat second end, wherein the tail cleat first end is closer to the second belt end than the tail cleat second end and wherein the tail cleat first end is proximate the main cleat second end.

16. A method of conveying product on a conveyor with reduced vibrations comprising:
   providing a conveyor comprising a conveyor belt to which a plurality of first cleats is attached in a spaced-apart configuration, wherein the conveyor belt comprises a first side edge that is opposite a second side edge, wherein the conveyor belt further comprises a first belt end and a second belt end that is opposite the first belt end, wherein each of the first cleats comprises a main cleat portion and a first tail cleat portion, wherein the main cleat portion comprises a main cleat first end and a main cleat second end, wherein the main cleat first end is proximate the first side edge, wherein the main cleat portion is oriented at an angle of less than about 90 degrees with respect to the first side edge, wherein the first tail cleat portion comprises a tail cleat first end and a tail cleat second end, wherein the tail cleat first end is closer to the second belt end than the tail cleat second end, wherein the first tail cleat portion is attached to the main cleat portion, wherein the first tail cleat portion is proximate the second side edge and wherein the first tail cleat portion is oriented substantially parallel to the second side edge;

placing a product on the conveyor; and moving the conveyor.

17. The method of claim 16, and further comprising urging the product towards the first side edge as the conveyor moves.

18. The method of claim 16, wherein the main cleat first end is proximate the first side edge and wherein the first tail cleat portion is proximate the second side edge.

19. The method of claim 16, wherein the angle is between about 85 degrees and about 45 degrees.

20. The method of claim 16, and further comprising a second tail cleat portion, wherein an end of the second tail cleat portion is proximate the main cleat first end, wherein the first tail cleat portion extends from the main cleat portion towards the first belt end and wherein the second tail cleat portion extends from the main cleat portion towards the second belt end.

21. The method of claim 20, wherein the main cleat portion is substantially linear, wherein the first tail cleat portion is proximate the second side edge and wherein the second tail cleat portion is proximate the first side edge.

22. The method of claim 16, wherein the conveyor further comprises a plurality of second cleats attached to the conveyor belt, wherein each of the second cleats comprises a main cleat portion and a first tail cleat portion, wherein the main cleat portion comprises a main cleat first end and a main cleat second end, wherein the main cleat first end is closer to the second side edge than the main cleat second end, wherein the main cleat portion is oriented at an angle of less than about 90 degrees with respect to the second side edge, wherein the first tail cleat portion comprises a tail cleat first end and a tail cleat second end, wherein the tail cleat first end is closer to the second belt end than the tail cleat second end and wherein the tail cleat first end is proximate the main cleat second end.

* * * * *